United States Patent [19]
Sagawa

[11] Patent Number: 5,989,482
[45] Date of Patent: Nov. 23, 1999

[54] METHOD AND APPARATUS FOR MANUFACTURING MULTI-LAYER BOTTLE

[75] Inventor: Hirofumi Sagawa, Kanagawa, Japan

[73] Assignee: The Japan Steel Works, Ltd., Tokyo, Japan

[21] Appl. No.: 08/959,487

[22] Filed: Oct. 28, 1997

[30] Foreign Application Priority Data

Oct. 29, 1996 [JP] Japan ..................................... 8-286828
Oct. 29, 1996 [JP] Japan ..................................... 8-286829

[51] Int. Cl.$^6$ ............................ B29C 49/22; B29C 49/04
[52] U.S. Cl. ......................... 264/515; 156/156; 425/503; 425/504; 425/523
[58] Field of Search ................................... 264/515, 549; 425/503, 523, 504; 156/156

[56] References Cited

U.S. PATENT DOCUMENTS

| | | | |
|---|---|---|---|
| 3,140,004 | 7/1964 | Schaich | 264/515 |
| 5,447,678 | 9/1995 | Kneer et al. | 264/515 |
| 5,454,707 | 10/1995 | Mitchell et al. | 264/549 |
| 5,567,377 | 10/1996 | Nishigami et al. | 264/515 |

FOREIGN PATENT DOCUMENTS

| | | | |
|---|---|---|---|
| 2119200 | 12/1970 | France | 264/515 |
| 46-29994 | 8/1971 | Japan | 264/515 |
| 5-213372 | 8/1993 | Japan . | |

*Primary Examiner*—Jan H. Silbaugh
*Assistant Examiner*—Dae Young Lee
*Attorney, Agent, or Firm*—Oblon, Spivak, McClelland, Maier & Naustadt, P.C.

[57] ABSTRACT

A method and an apparatus for manufacturing a multi-layer bottle by discharging an inner layer parison from a multi-layer die head and pinching a lower portion of the inner layer parison by a pinch apparatus; discharging an outer layer parison which is longer than the inner layer parison; pinching the lower portion of the outer layer parison by a molding mold; and blow molding the inner layer parison. In such a manner, the multi-layer bottle is manufactured. When the multi-layer bottle having an inner layer separating function is manufactured, the inner layer parison and the outer layer parison comprise different resins having no adhesivity to each other.

7 Claims, 9 Drawing Sheets

METHOD AND APPARATUS FOR MANUFACTURING MULTI-LAYER BOTTLE

BACKGROUND OF THE INVENTION

1. Field of the Invention

The present invention relates to a method and an apparatus for manufacturing a multi-layer bottle. More specifically, the present invention relates to a method and an apparatus for manufacturing a multi-layer bottle which has a separating function.

2. Description of the Related Art

Heretofore, a multi-layer bottle has been molded in the following manner. In the first place, a multi-layer die head of a blow molding machine is used so as to make a plurality of molten resins supplied from a plurality of extruders a laminar shape. Next, each layer is joined to each other in a nozzle of the die head so as to form an integral parison. Finally, the parison is discharged between molds.

Figure 1A:
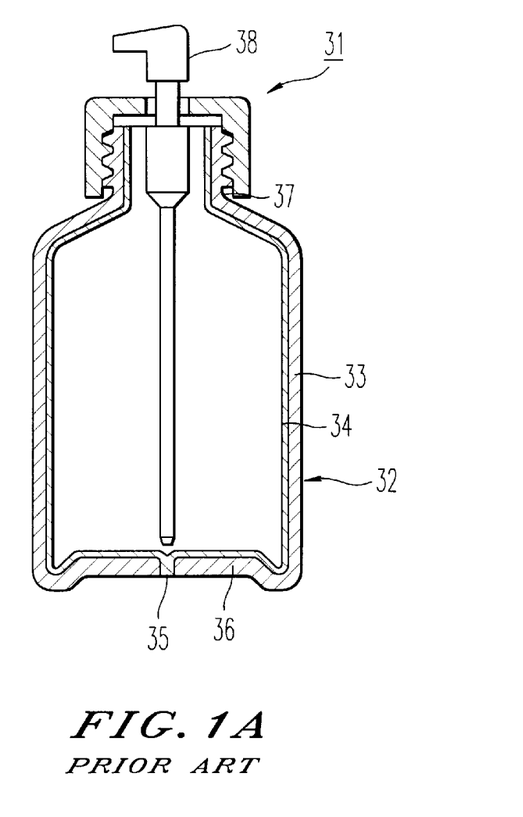
FIG. 1a is a vertical sectional view of the prior art multi-layer bottle.
Figure 1B:
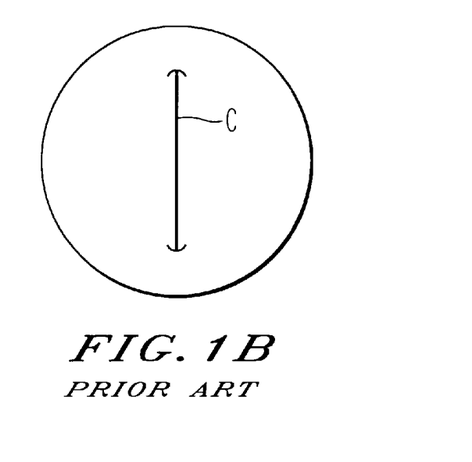

Recently, the multi-layer bottle having a separating function has been used as the bottle for a shampoo, a rinse or the like. In case of the aforementioned bottle, when contents are discharged from a pouring pump fitted to an opening of the bottle, a negative pressure is caused in the bottle. This results in a deformation of an appearance of the bottle and a difficulty in the discharge of the contents. In order to prevent this, for example, Japanese Patent Application Laid-open No. 213372/1993 proposes a multi-layer bottle 31 as shown in FIGS. 1a and 1b. A wall of a body 32 of the multi-layer bottle 31 comprises a two-layer structure: an outer layer 33 and an inner layer 34. The outer layer 33 and the inner layer 34 are formed of different resins which are not adhered to each other. A wall thickness of the inner layer 34 is thinner than that of the outer layer 33. In case of the bottle 31, when the contents are discharged and thus the inner layer 34 is shrunk, a pinch-off of the inner layer 34 is removed from a bottom portion of the outer layer 33 so that a vent hole 35 is formed on the bottom portion of the outer layer 33. The vent hole 35 is disposed in order to prevent a vacuum status which occurs when a reduction of the contents causes the inner layer 34 to be shrunk. Typically, after a molding of the multi-layer bottle, the inner layer 34 is once separated and then the vent hole 35 is formed in the outer layer 33. The thus manufactured bottle 31 appears to be integrally structured immediately after the molding due to a multi-layer molding which uses the different resins, each having no adhesivity to each other. However, whenever the contents are discharged from a pouring pump 38 fitted to an opening 37 of the bottle 31, the outer layer 33 remains while the inner layer 34 is gradually shrunk. Thus, the contents can be efficiently discharged to the end.

Since the prior art multi-layer bottle is constructed in the above-described manner, the following problems exist:

(a) when the multi-layer bottle has an inner layer separating function, the inner layer is typically thinner than the outer layer. Thus, during the molding of the parison, the circumferential wall thickness of the inner layer is subject to variation due to change in the wall thickness of the outer layer;

(b) when a pinch-off portion of the molded multi-layer bottle has a multi-layer structure, more specifically, when the multi-layer bottle has the inner layer separating function, since a material having the separating function is used as an inner layer parison, a strength is weakened in the pinch-off portion;

(c) since the parison is multi-layered over the total length thereof, a pinched-off burr is also multi-layered and thus it is difficult to reuse the burr;

(d) when the multi-layer bottle has the inner layer separating function, it is desirable that the inner layer is crushed to a small size in order to improve dischargeability of the contents. However, typically, as shown in FIG. 1b, since a width C of inner/outer layer pinch-off is wide, the pinch-off portions presses against the inner layer and thereby the inner layer is difficult to crush. Furthermore, since the wall thickness in the periphery of the pinch-off portion has less blow ratio, the wall is thicker and thereby the inner layer is more difficult to crush. Thus, the dischargeability of the contents becomes worse;

(e) when the vent hole is formed in the outer layer of the multi-layer bottle having the inner layer separating function, the formation takes a lot of time. At that time, there is a fear of the crush or deformation of the bottle body. There is arisen another problem about a removal of cutting powder which is generated when the pinch-off portion is separated and the hole is formed; and (f) when the multi-layer bottle has the inner layer separating function, during the discharge of the contents, a lower portion of the inner layer is also separated from the outer layer. Thus, the inner layer is vibrated, and therefore an outer surface of the inner layer comes into contact with an inner surface of the outer layer, thereby generating a noise.

SUMMARY OF THE INVENTION

It is an object of the present invention to provide a method and an apparatus for manufacturing a multi-layer bottle which has a pinch-off portion of high strength and can reclaim a burr of the pinch-off portion.

It is another object of the present invention to provide a method and an apparatus for manufacturing a multi-layer bottle which is suitable to a manufacturing of the multi-layer bottle having an inner layer separating function.

In order to achieve the above objects, according to one aspect of the present invention, a method and an apparatus for manufacturing a multi-layer bottle comprise discharging an inner layer parison from a multi-layer die head and pinching a lower portion of the inner layer parison; discharging an outer layer parison which is longer than the inner layer parison; pinching the lower portion of the outer layer parison by a molding mold; and blow molding the inner layer parison. In such a manner, the multi-layer bottle is manufactured. When the multi-layer bottle having the inner layer separating function is manufactured, the inner layer parison and the outer layer parison comprise different resins having no adhesivity to each other. When the lower portion of the outer layer parison is pinched by the molding mold, one part of the lower portion of the inner layer parison is also pinched together.

According to another aspect of the present invention, a method and an apparatus for manufacturing a multi-layer bottle comprise transferring a preform just below a die head by a preform transfer apparatus; discharging a parison from the die head to an outer periphery of the preform; pinching an upper portion of the parison by a molding mold; and blow molding the preform. In such a manner, the multi-layer bottle is manufactured.

The above and other objects, features and advantages of the present invention will become apparent from the following description based on the accompanying drawings which illustrate an example of preferred embodiments of the present invention.

BRIEF DESCRIPTION OF THE DRAWINGS

FIG. 1b is a bottom view of the multi-layer bottle shown in FIG. 1a;

FIG. 5b is a bottom view of the multi-layer bottle shown in FIG. 5a;

FIG. 5c is a sectional view taken on line I—I of the multi-layer bottle shown in FIG. 5a;

FIG. 10b is a bottom view of the multi-layer bottle shown in FIG. 10a.

DETAILED DESCRIPTION OF THE PREFERRED EMBODIMENTS

Preferred embodiments of the present invention will be described below.

Embodiment 1

Figure 2A:
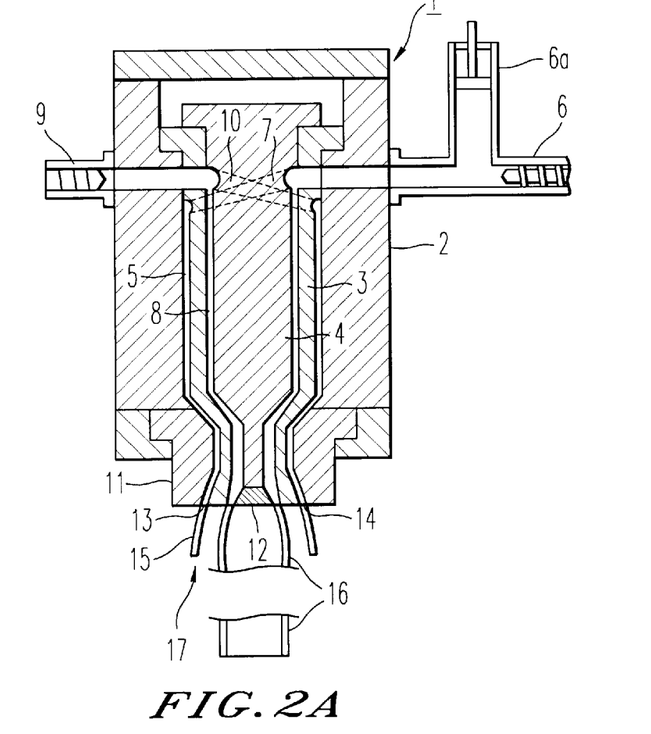
FIG. 2 shows an arrangement of a multi-layer bottle manufacturing apparatus according to a first embodiment.
Figure 2B:
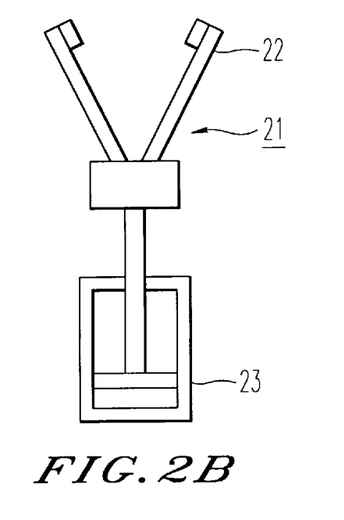

A multi-layer bottle manufacturing apparatus of a first embodiment will be described with reference to FIG. 2. In FIG. 2, reference numeral 1 denotes a multi-layer die head. A cylindrical member 3 is fittingly inserted in a head body 2 of the multi-layer die head 1. A head core 4 is fittingly inserted in the cylindrical member 3.

A cylindrical outer layer flow passage 5 is arranged between the head body 2 and the cylindrical member 3. The outer layer flow passage 5 is communicated, through a manifold 7, with an outer layer extruder 6 which is connected to the head body 2 and has an accumulator 6a on the tip end thereof. The outer layer extruder 6 having the accumulator 6a may be replaced by an injection molding machine.

A cylindrical inner layer flow passage 8 is arranged between the cylindrical member 3 and the head core 4. The inner layer flow passage 8 is communicated, through a manifold 10, with an inner layer extruder 9 connected to the head body 2.

A die outer cylinder 11 is fitted to a lower portion of the head body 2. A die inner cylinder 12 is fitted to the lower portion of the head core 4. An outer layer nozzle 13 is an annular space between the die outer cylinder 11 and the cylindrical member 3. An inner layer nozzle 14 is the annular space between the cylindrical member 3 and the die inner cylinder 12.

The die outer cylinder 11 is moved horizontally in the drawing so that the space of the outer layer nozzle 13 can be flexibly adjusted and thereby a wall thickness of an outer layer parison 15 can be adjusted. Furthermore, the die inner cylinder 12 is vertically moved through a vertical rod not shown so that the space of the inner layer nozzle 14 can be flexibly adjusted and thereby the wall thickness of an inner layer parison 16 can be adjusted. It can also be possible to move the die outer cylinder 11 vertically.

That is, an outer layer resin is intermittently extruded from the extruder 6 having the accumulator 6a. An inner layer resin is continuously extruded from the extruder 9. The outer and inner layer resins are supplied to the flow passages 5 and 8 through the manifolds 7 and 10 of the multi-layer die head 1, respectively, so that they are cylindrical in shape. Each wall thickness of the outer and inner layer resins is adjusted by the nozzles 13 and 14. The outer layer parison 15 and the inner layer parison 16 are individually discharged as a separate parison 17. It is the following reason that the outer layer parison 15 is intermittently extruded and the inner layer parison 16 is continuously extruded. Namely, as described below, after a pinching of the lower portion of the inner layer parison 16, the lower portion of the outer layer parison 15 is then pinched below the inner layer parison 16. It is noted that the inner layer parison 16 may be intermittently extruded.

Reference numeral 21 denotes a pinch apparatus which is disposed below the multi-layer die head 1 and is for pinching the inner layer parison 16. The pinch apparatus 21 comprises a pinch section 22 for pinching the inner layer parison 16 discharged from the multi-layer die head 1 and a cylinder section 23 for vertically moving the pinch section 22.

Figure 3:
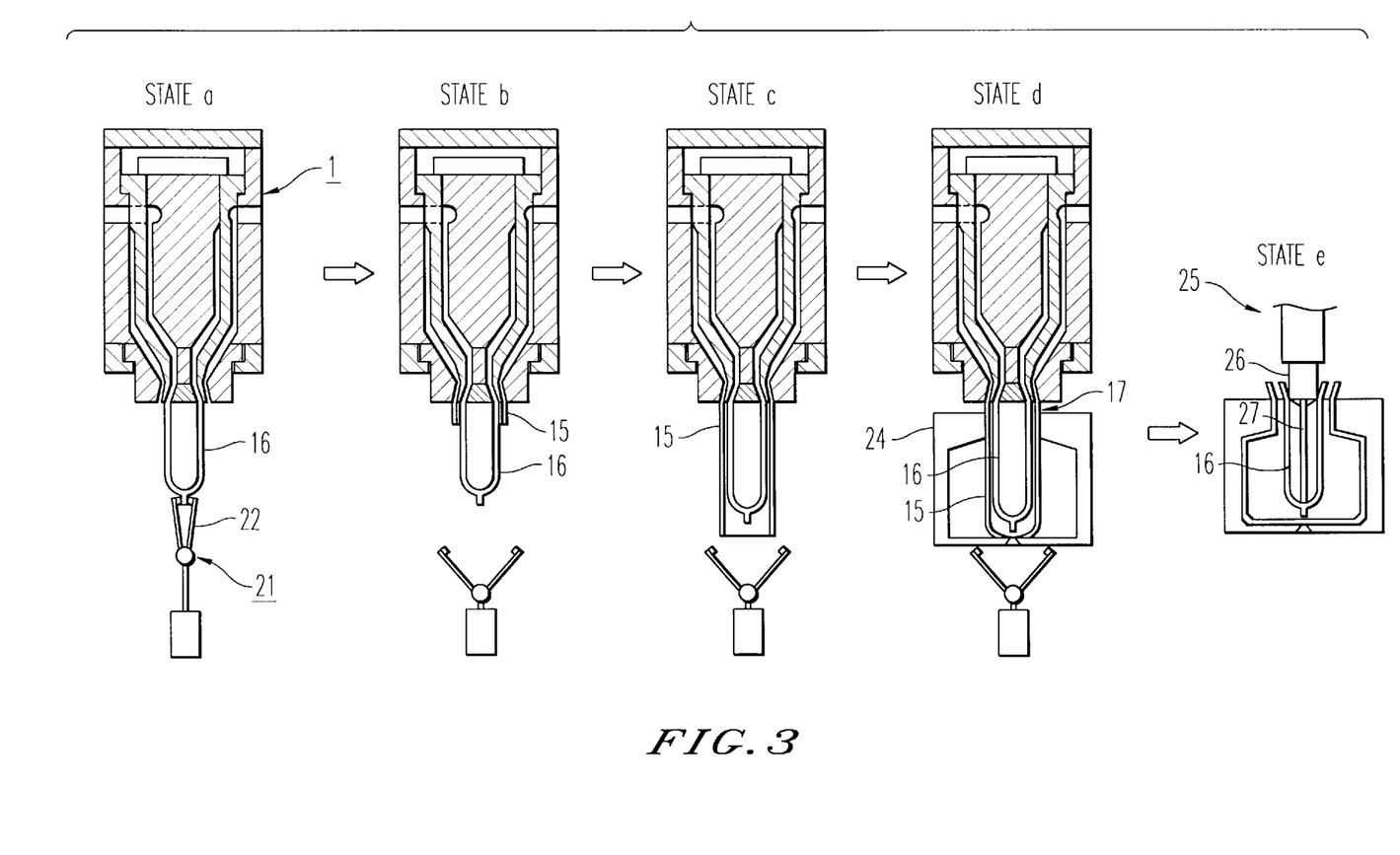
FIG. 3 is an illustration showing steps of manufacturing the multi-layer bottle according to the first embodiment.
Figure 4:
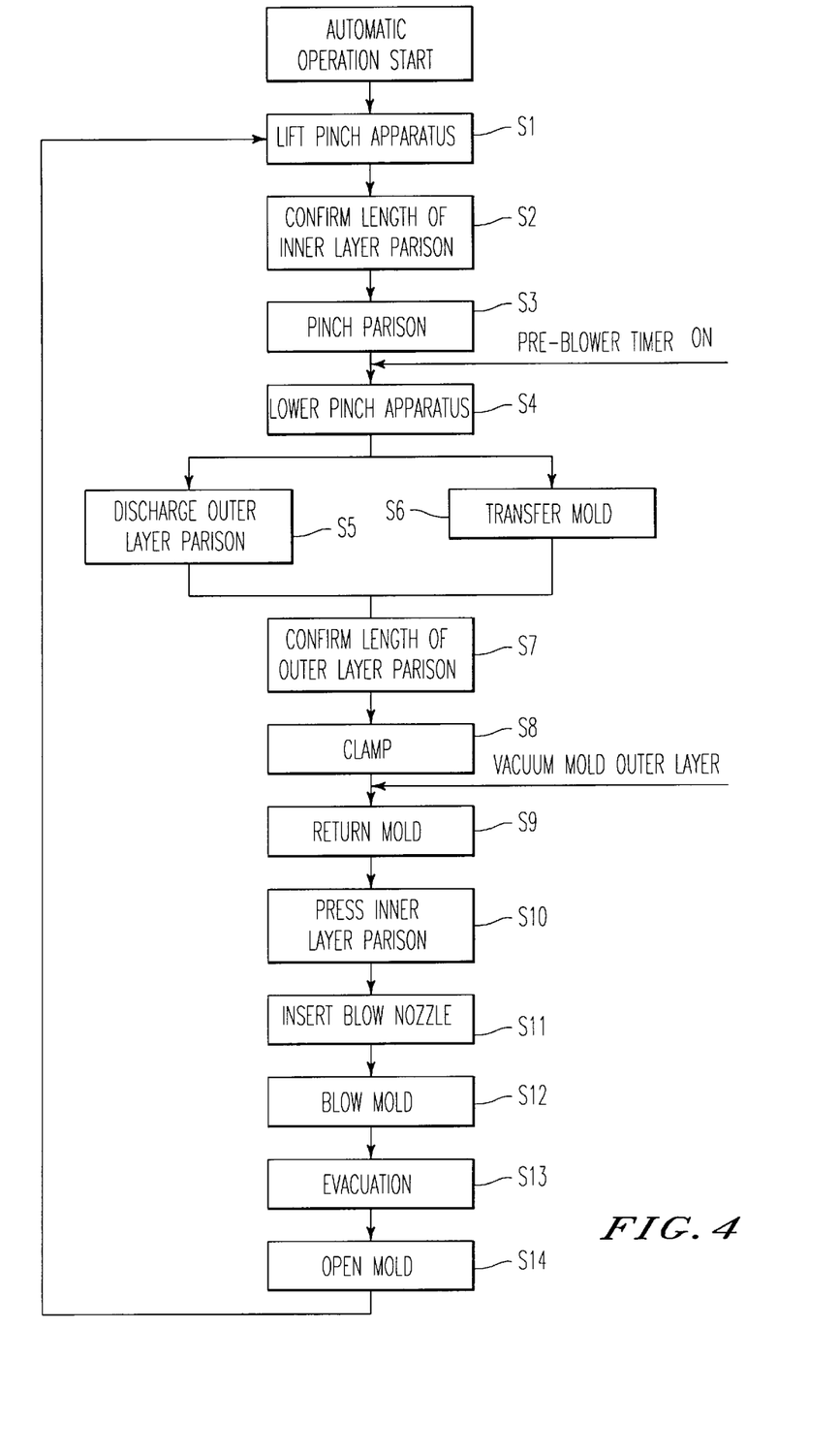
FIG. 4 is a flow chart for describing the manufacturing steps shown in FIG. 3.

Next, steps of manufacturing the multi-layer bottle will be described with reference to states a through e of FIG. 3 and each step of FIG. 4.

In a state a, when an automatic operation is started, the discharge of the inner layer parison 16 is started, and then the pinch apparatus 21 is lifted (step S1). A length of the inner layer parison 16 is confirmed by a position detecting apparatus such as a phototube (step S2). The pinch section 22 of the pinch apparatus 21 is then closed so as to pinch the lower portion of the inner layer parison 16 (step S3). Next, the pinch section 22 is opened so as to lower the pinch apparatus 21 (step S4). An actuation of a pre-blow timer allows an air to be supplied into the inner layer parison 16. This prevents the inner layer parison 16 from deforming.

In a state b, the discharge of the outer layer parison 15 is started (step S5). A molding mold (not shown) is transferred just below the die head 1 (step S6). Since the inner layer parison 16 and the outer layer parison 15 are discharged so that they may be the separate parison, the parisons are not influenced by other layers during a molding of each parison.

In a state c, the outer layer parison 15 is discharged so that it may be longer than the inner layer parison 16. The length of the outer layer parison 15 is confirmed by the position detecting apparatus such as the phototube (step S7).

In a state d, a molding mold 24 is clamped (step S8) so as to pinch the lower portion of the outer layer parison 15 and to cut off an upper portion of the separate parison 17. Next, the air in the mold is sucked from an outside peripheral wall of the molding mold 24 so as to vacuum mold the outer layer parison 15. When the lower portion of the outer layer parison 15 is pinched, the lower portion of the inner layer parison 16 is also partially pinched. Thus, a bottom portion of the inner layer parison 16 can be fixed.

In a state e, the molding mold 24 is returned just below a blow nozzle 26 of an air blow apparatus 25 (step S9). An inner layer fixing pin 27 is driven into the inner layer parison 16 so as to press against the inner layer parison 16 (step S10). The blow nozzle 26 is inserted into the inner layer parison 16 (step S11) so as to start blow molding the inner layer parison 16 (step S12). After the blow molding of the inner layer parison 16 is completed, the blown air in the inner layer parison 16 is evacuated (step S13). The molding mold 24 is opened (step S14) so as to remove the molded multi-layer bottle from the molding mold 24. Next, the operation is returned to the step S1 so as to perform the following molding in the same manner.

Figure 5A:
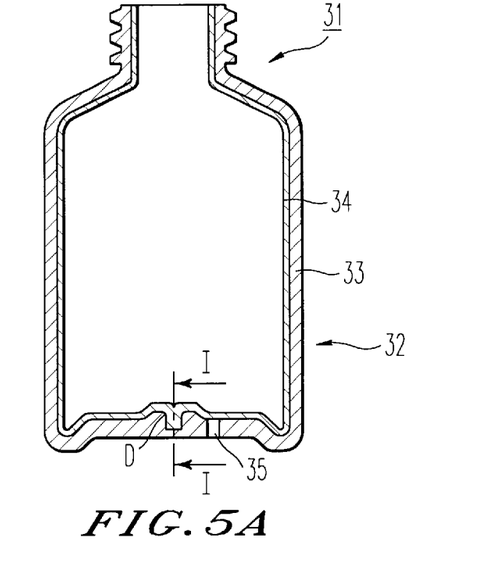
FIG. 5a is a vertical sectional view of the multi-layer bottle according to the first embodiment.
Figure 5B:
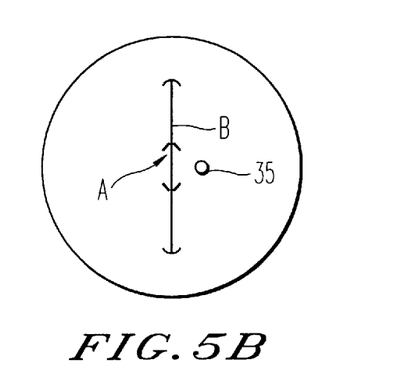
Figure 5C:
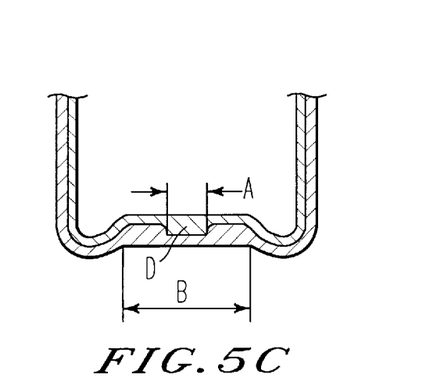

As shown in FIGS. 5b and 5c, in a multi-layer bottle 31 according to the embodiment, a width of an inner layer pinch-off A is far smaller than that of an outer layer pinch-off B. Thus, the wall thickness of the inner layer 34 in the periphery of a pinch-off portion become thinly uniform, because of a higher blow ratio. Therefore, in case of the multi-layer bottle 31 having a separating function, since an inner layer 34 is easily crushed, dischargeability of contents is improved.

Moreover, since few inner layer resin is present in the pinch-off portion, it is possible to increase a strength of the multi-layer bottle and to reclaim a burr of the pinch-off portion.

Furthermore, as shown in FIGS. 5a and 5c, when the multi-layer bottle 31 having the separating function is manufactured, a pinch portion D is formed outside the bottom portion of the inner layer 34. The pinch portion D is partially pinched and fixed by the pinch portion which is disposed inside the bottom portion of an outer layer 33. Therefore, during the discharge of contents, crushability is high thereby resulting in high dischargeability. In addition, even if the inner layer 34 is separated and thus the space is formed between the inner layer 34 and the outer layer 33, an outer surface of the inner layer 34 does not come into contact with an inner surface of the outer layer 33. Accordingly, a noise is not caused.

When the multi-layer bottle 31 having the separating function is manufactured, it is necessary to form, in the outer layer 33 of a body 32 of the multi-layer bottle 31, a vent hole 35 for flowing the air between the outer layer 33 and the inner layer 34. A multi-layer parison according to the embodiment is not an integral parison, but the separate parison. Furthermore, a method of molding the outer layer parison is different from that of molding the inner layer parison. Thus, prior to the molding of the outer layer parison, the pin is previously protruded from a mold cavity. Alternatively, after the molding, the pin is protruded and thereby the vent hole can be readily formed. The vent hole can be bored in any position. Moreover, since the vent hole can be formed in the step of molding the outer layer parison, the step can be reduced. Since the bottle is not deformed, defective products are not produced. Furthermore, it is not necessary to remove cutting powder after a process.

In the aforementioned embodiment, the two-layer die head comprising the inner layer parison and the outer layer parison is described above. Alternatively, the inner and outer layer parisons may comprise a plurality of layers, respectively.

In the aforementioned embodiment, the manufacturing of the multi-layer bottle which mainly has the separating function is described. On the other hand, an adhesive layer is used as an outer wall of the inner layer parison or an inner wall of the outer layer parison so that a typical multi-layer bottle can be also manufactured.

Embodiment 2

Figure 6:
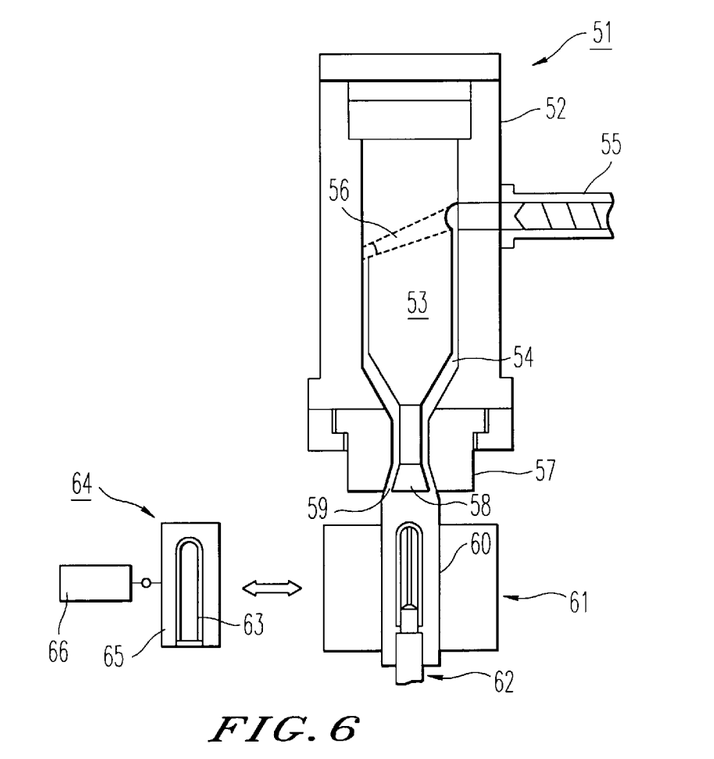
FIG. 6 shows an arrangement of the multi-layer bottle manufacturing apparatus according to a second embodiment.

The multi-layer bottle manufacturing apparatus of a second embodiment will be described with reference to FIGS. 6 and 7. In FIG. 6, reference numeral 51 denotes a die head. A head core 53 is fittingly inserted in a head body 52 of the die head 51.

A cylindrical resin flow passage 54 is disposed between the head body 52 and the head core 53. The resin flow passage 54 is communicated, through a manifold 56, with an extruder 55 connected to the head body 52.

A die outer cylinder 57 is fitted to the lower portion of the head body 52. A die inner cylinder 58 is fitted to the lower portion of the head core 53. A discharge nozzle 59 is the annular space between the die outer cylinder 57 and the die inner cylinder 58.

The die outer cylinder 57 is moved horizontally in the drawing so that the space of the discharge nozzle 59 can be flexibly adjusted and thereby the circumferential wall thickness of a parison 60 discharged from the discharge nozzle 59 can be adjusted.

That is, a molten resin is intermittently or continuously extruded from the extruder 55. The molten resin is then supplied into the resin flow passage 54 through the manifold 56 of the die head 51 so that it is cylindrically shaped. The wall thickness of the resin is adjusted by the discharge nozzle 59 before the parison is discharged.

Below the die head 51 is disposed a lower air blow apparatus 62 for blowing the air into a preform 63. The molding mold 61 is for vacuum molding the parison 60 by sucking the air in the mold from the outside peripheral wall thereof.

A preform transfer apparatus 64 is disposed below and beside the die head 51. The transfer apparatus 64 comprises a preform box 65 for heating the preform 63 molded by the injection molding machine and a driver 66 for transferring the preform box 65 just below the die head 51.

Figure 7:
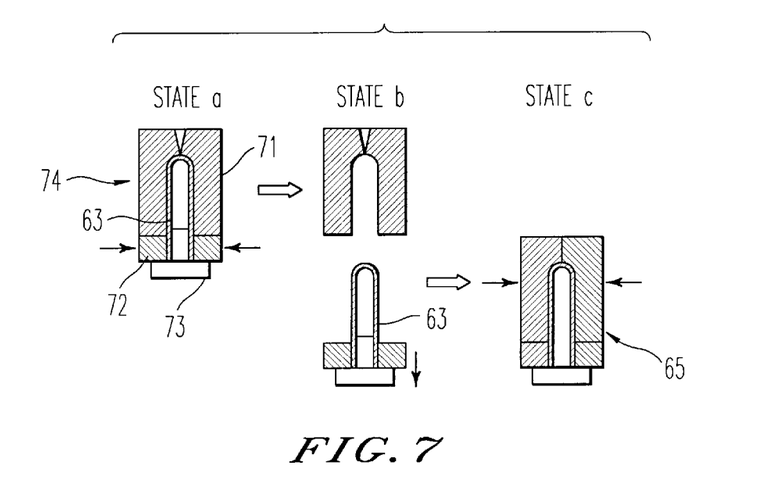
FIG. 7 shows generally preform molding steps.

As shown in FIG. 7, the preform 63 is molded by injecting the molten resin from the injection molding machine to an injection mold 74 which comprises a cavity mold 71, a neck mold 72 and a core mold 73 as shown in the state a. As shown in the state b, the molded preform 63 is removed from the cavity mold 71. Next, in order to mold a blow molded article, as shown in the state c, the preform 63 is reheated in the preform box 65.

The method of molding the blow molded article from the preform includes a hot parison method and a cold parison method. The hot parison method is accomplished by transferring the molded preform to a temperature adjusting step without completely cooling the preform and then blow molding the preform. The cold parison method is accomplished by once cooling the molded preform, reheating the parison and then blow molding the preform. Preferably, the cold parison method is applied to the embodiment.

Figure 8:
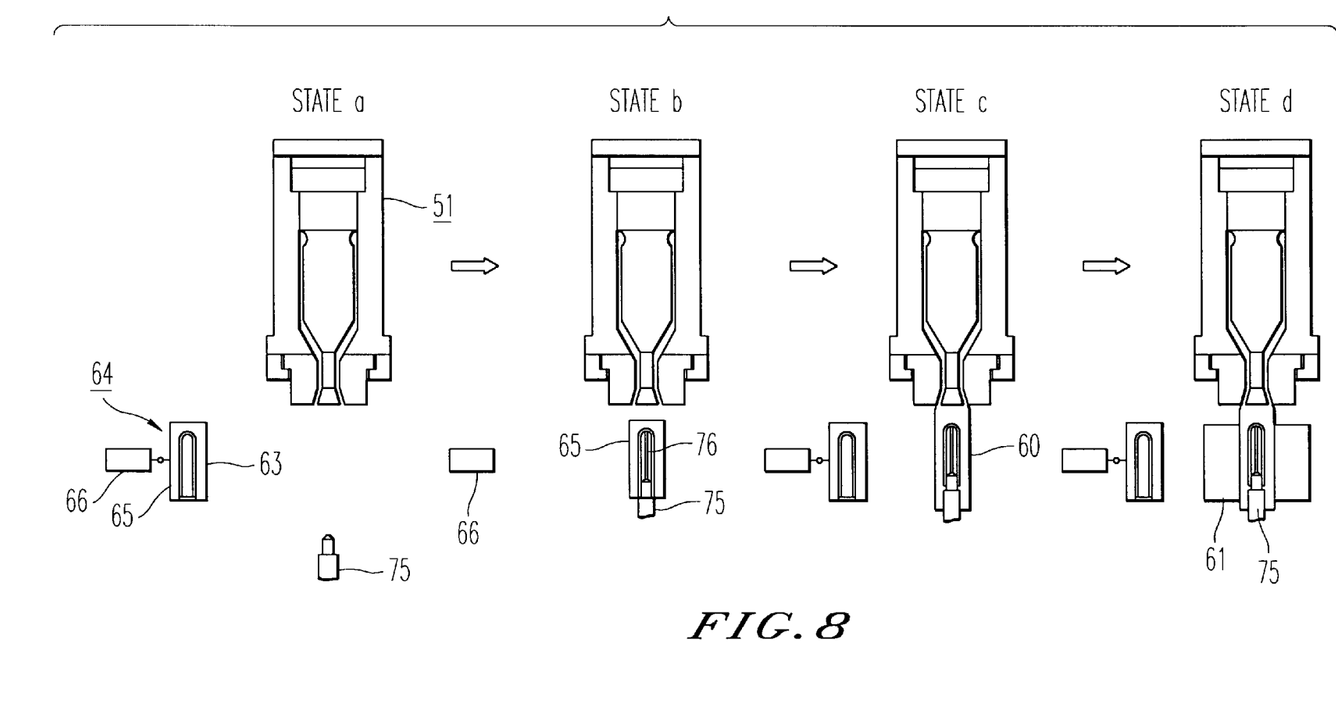
FIG. 8 is an illustration showing the steps of manufacturing the multi-layer bottle according to the second embodiment.
Figure 9:
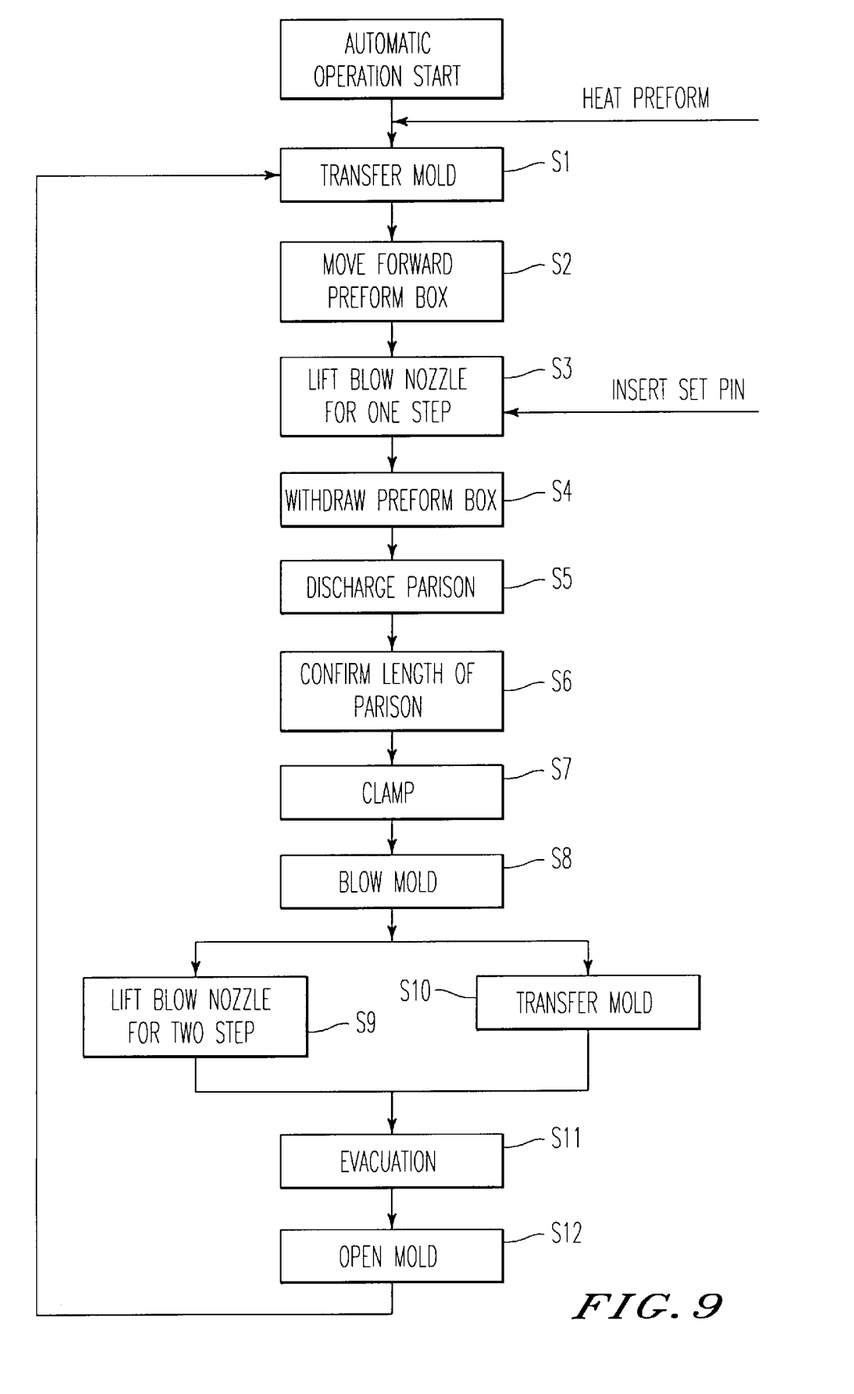
FIG. 9 is a flow chart for describing the manufacturing steps shown in FIG. 8.

The multi-layer bottle manufacturing steps will be described below with reference to the states a through d of FIGS. 8 and each step of FIG. 9.

In the step a, when the automatic operation is started, the heat of the preform 63 is started in the preform box 65. At the same time, the molding mold (not shown) is moved forward just below the die head 51 (step S1).

In the step b, the preform box 65 is moved forward just below the die head 51 by the driver 66 (step S2). A blow nozzle 75 of the lower air blow apparatus 62 is lifted for a single step so as to insert a set pin into the preform 63 in the preform box 65 (step S3).

In the state c, the preform box 65 is opened so as to withdraw the preform box 65 (step S4). Next, the parison 60 is discharged from the die head 51 to an outer periphery of the preform 63 (step S5).

In the state d, the length of the parison is confirmed (step S6). The molding mold 61 is clamped so as to pinch the upper and lower portions of the parison 60 (step S7). When the upper portion of the parison 60 is pinched, the upper portion of the preform 63 is partially pinched together. Thus, the bottom portion of the preform 63 can be fixed.

Next, the parison 60 is vacuum molded by sucking the air in the mold from the outside peripheral wall of the molding mold 61. The air is then blown from the blow nozzle 75 so as to blow mold the preform 63 (step S8).

Next, the blow nozzle 75 is lifted for two steps (step S9) so as to mold an opening of the bottle. The molding mold 61 is transferred (step S10). The air blown into the preform is evacuated (step S11). The molding mold 61 is opened so as to remove the molded multi-layer bottle from the molding mold 61 (step S12). Next, the operation is returned to the step 1 so as to carry out the following molding in the same manner.

Figure 10A:
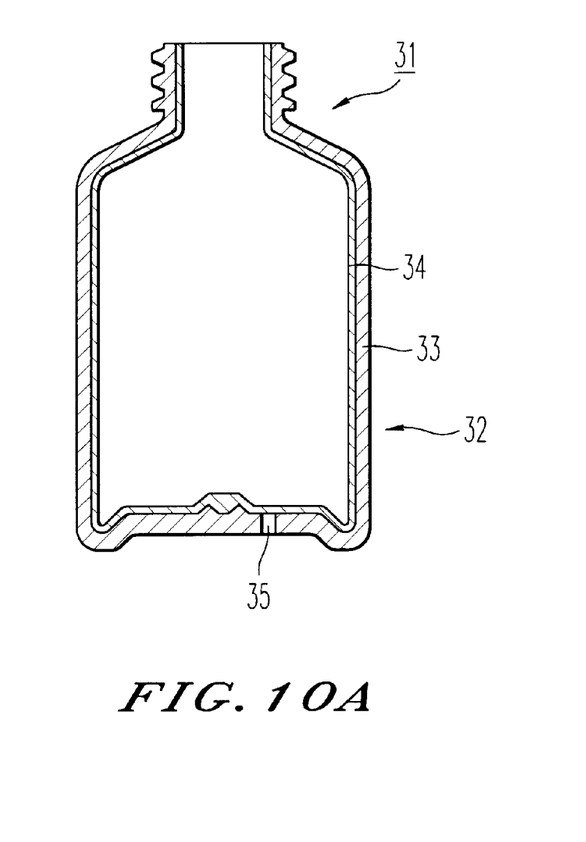
FIG. 10a is a vertical sectional view of the multi-layer bottle according to the second embodiment.
Figure 10B:
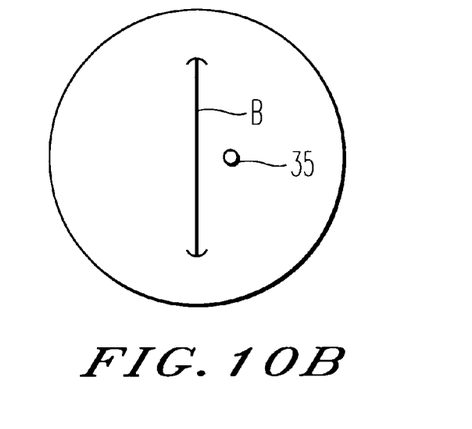

As shown in FIGS. 10a and 10b, the multi-layer bottle 31 of the embodiment is not typically provided with the pinch-off portion, but provided with the outer layer pinch-off B alone. Therefore, when the multi-layer bottle 31 has the separating function, the inner layer 34 of the body 32 is easily crushed, and thereby the dischargeability of the contents is improved.

Furthermore, since the inner layer resin does not exist in the pinch-off portion, it is possible to increase the strength of the multi-layer bottle and to reclaim the burr of the pinch-off portion.

Moreover, when the multi-layer bottle 31 having the separating function is manufactured, the bottom portion of the inner layer 34 is partially pinched and fixed by the pinch portion which is disposed inside the bottom portion of the outer layer 33. Thus, as is the case with the first embodiment, the crushability is high thereby resulting in the high dischargeability during the discharge of the contents. In addition, the outer surface of the inner layer 34 does not come into contact with the inner surface of the outer layer 33. Accordingly, the noise is not caused.

It is also possible to easily form the vent hole 35 for flowing the air between the outer layer 33 and the inner layer 34 in the same manner as the first embodiment.

In the embodiment, various kinds of materials can be selected as the material of the inner layer by changing the material of the preform. The wall thickness of the inner layer can be also flexibly changed by changing the wall thickness of the preform. Moldability of the opening of the bottle is greatly improved and sealing properties of the opening are also improved. Since the preform is used for the inner layer, even the apparatus for manufacturing a single-layer bottle can be used for a multi-layer molding.

In the aforementioned embodiment, the manufacturing of a two-layer bottle comprising the preform and the outer layer parison is described above. Alternatively, the preform and the outer layer parison comprise a plurality of layers, respectively, and thereby the multi-layer bottle having two or more layers can be manufactured.

In the aforementioned embodiment, the manufacturing of the multi-layer bottle which mainly has the separating function is described. On the other hand, the adhesive layer is used as the inner wall of the outer layer parison or the outer wall of the preform and thereby the typical multi-layer bottle can be also manufactured.

In the first and second embodiments described above, the parison, which is to be the outer layer, is vacuum molded. Next, the air is blown into the inner layer parison or the preform so as to perform the molding. Alternatively, the air is blown into the inner layer parison or the preform without the vacuum molding of the parison which is to be the outer layer, and then the parison to be the outer layer can be molded together with the inner layer parison.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of manufacturing a multi-layer bottle comprising the steps of:

discharging an inner layer parison from a multi-layer die head and pinching a lower portion of said inner layer, thereby forming a pinched portion;

discharging an outer layer parison which is longer than said inner layer parison intermittently;

pinching a lower portion of said outer layer parison together with the pinched portion of the inner layer parison by a molding mold, thereby engaging said outer layer with the pinched portion of the inner layer;

protruding a pin from said molding mold for forming a vent hole in said outer layer parison; and blow molding said inner layer parison, wherein said inner layer parison and said outer parison comprise different resins having no adhesivity to each other.

2. The method according to claim 1, further comprising the step of sucking air in said molding mold so as to vacuum mold said outer layer parison after the step of pinching said lower portion of said outer layer parison.

3. The method according to claim 1, further comprising the step of driving an inner layer fixing pin into said inner layer, before the step of blow molding said inner layer parison.

4. A multi-layer bottle manufacturing apparatus comprising:

a multi-layer die head for independently discharging a parison from each of a plurality of nozzles;

a pinch apparatus for pinching a lower portion of an inner layer parison discharged from said die head;

an intermittent extruding means for discharging an outer layer parison so that said outer layer parison is longer than said inner layer parison;

a molding mold configured to pinch a lower portion of an outer layer parison together with the pinched portion of said inner layer parison, said molding mold including means for protruding a pin therefrom for forming a vent hole in said outer layer parison; and an air blow apparatus for blowing air into said inner layer parison in said molding mold.

5. The apparatus according to claim 4, wherein said molding mold is configured for sucking air from said molding mold so as to vacuum mold said outer layer parison.

6. The apparatus according to claim 4, wherein said air blow apparatus having a blow nozzle and an inner layer fixing pin.

7. The apparatus according to claim 4, wherein said pinch apparatus is disposed below said molding mold which is transferred from said air blow apparatus to just below said die head.

* * * * *